(12) United States Patent
Yao

(10) Patent No.: US 8,249,526 B2
(45) Date of Patent: Aug. 21, 2012

(54) SYSTEM AND METHOD FOR SENDING A SAFETY MONITOR REPORT USING A MOBILE DEVICE

(75) Inventor: Xu-Qi Yao, Shenzhen (CN)

(73) Assignees: Shenzhen Futaihong Precision Industry Co., Ltd., ShenZhen, Guangdong Province (CN); Chi Mei Communication Systems, Inc., Tu-Cheng, New Taipei (TW)

( * ) Notice: Subject to any disclaimer, the term of this patent is extended or adjusted under 35 U.S.C. 154(b) by 378 days.

(21) Appl. No.: 12/511,237

(22) Filed: Jul. 29, 2009

(65) Prior Publication Data
US 2010/0167708 A1  Jul. 1, 2010

(30) Foreign Application Priority Data
Dec. 31, 2008 (CN) .......................... 2008 1 0306757

(51) Int. Cl.
*H04B 1/38* (2006.01)
*G01P 15/00* (2006.01)
*G01P 5/00* (2006.01)
*A61B 5/103* (2006.01)

(52) U.S. Cl. .......................... 455/90.1; 702/141; 600/595
(58) Field of Classification Search .............. 455/404.1, 455/90.1; 600/595; 702/141, 142
See application file for complete search history.

(56) References Cited

U.S. PATENT DOCUMENTS

| 7,415,380 | B2* | 8/2008 | Suzuki ............... 702/142 |
| 7,961,109 | B2* | 6/2011 | Jang et al. ............... 340/573.1 |
| 2010/0121226 | A1* | 5/2010 | Ten Kate et al. ............ 600/595 |
| 2010/0323657 | A1* | 12/2010 | Barnard et al. ........... 455/404.1 |

* cited by examiner

*Primary Examiner* — George Eng
*Assistant Examiner* — Nam Huynh
(74) *Attorney, Agent, or Firm* — Altis Law Group, Inc.

(57) ABSTRACT

A safety monitoring system and method sets a preset acceleration and a preset gravity gradient of a mobile device, and a preset contact. If an obtained acceleration and a gravity gradient of the mobile device are greater than preset values, the system and method obtains positional data of the mobile device using a global positioning system (GPS) unit of the mobile device. The system and method further packs the positional data into short message service/multimedia message service (SMS/MMS) message, searches for the preset contact in the mobile device, and sends a safety monitor report to the preset contact by the SMS/MMS message.

12 Claims, 5 Drawing Sheets

| Gravity gradient (degrees) | X-axis | | Y-axis | |
| --- | --- | --- | --- | --- |
| | Acceleration of X-axis(g) | Acceleration change of X-axis(mg) | Acceleration of Y-axis(g) | Acceleration change of Y-axis(mg) |
| 90 | 1.000 | 0.15 | 0.000 | 17.45 |
| 85 | 0.996 | 1.37 | 0.087 | 17.37 |
| 80 | 0.985 | 2.88 | 0.174 | 17.16 |
| 70 | 0.940 | 5.86 | 0.342 | 16.35 |
| 60 | 0.866 | 8.59 | 0.500 | 15.04 |
| 45 | 0.707 | 12.23 | 0.707 | 12.23 |
| 30 | 0.500 | 15.04 | 0.866 | 8.59 |
| 20 | 0.342 | 16.35 | 0.940 | 5.86 |
| 10 | 0.174 | 17.16 | 0.985 | 2.88 |
| 5 | 0.087 | 17.37 | 0.996 | 1.37 |
| 0 | 0.000 | 17.45 | 1.000 | 0.15 |

FIG. 4B

SYSTEM AND METHOD FOR SENDING A SAFETY MONITOR REPORT USING A MOBILE DEVICE

BACKGROUND

1. Technical Field

Embodiments of the present disclosure relate to safety monitor management, and particularly to a system and method for sending a safety monitor report using a mobile device.

2. Description of Related Art

In our modern information-oriented society where communication systems are highly developed, compact-sized mobile phones are broadly utilized for communications between people in daily life. Mobile phones can be used to exchange information and communicate with each other almost anytime and anywhere. Currently, a mobile phone can determine a position of a user (e.g., an old person) using a global positioning system (GPS) unit. However, the current mobile phone cannot determine a safety status of the user.

BRIEF DESCRIPTION OF THE DRAWINGS

FIG. 4B is a schematic diagrams of an acceleration change of an X-axis and a Y-axis according to a gravity gradient of the mobile device.

DETAILED DESCRIPTION

All of the processes described below may be embodied in, and fully automated via, functional code modules executed by one or more general purpose mobile devices or processors. The code modules may be stored in any type of readable medium or other storage device. Some or all of the methods may alternatively be embodied in specialized hardware. Depending on the embodiment, the readable medium may be a hard disk drive, a compact disc, a digital video disc, or a tape drive.

Figure 1:
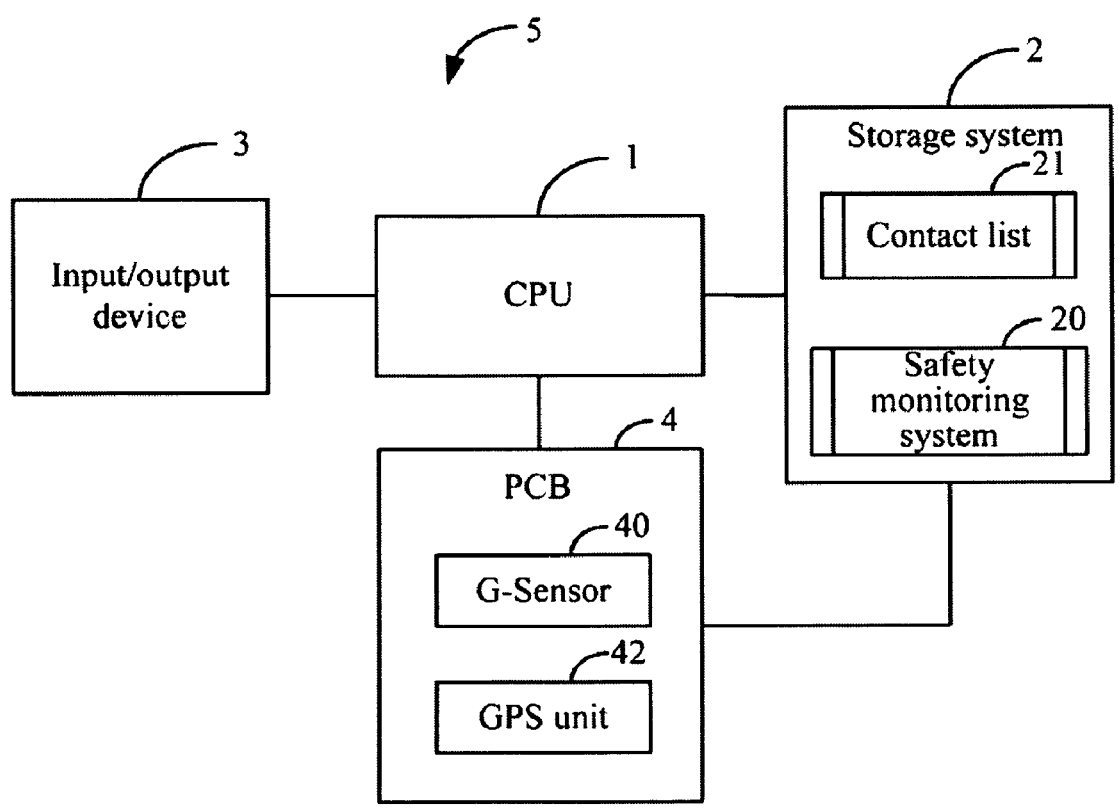
FIG. 1 is a schematic diagram of one embodiment of a mobile device comprising a safety monitoring system.

FIG. 1 is a schematic diagram of one embodiment of a mobile device 5 comprising a safety monitoring system 20. The safety monitoring system 20 may be used to send a safety monitoring report to a preset contact of the mobile phone 5 if an obtained acceleration and a gravity gradient of the mobile device 5 are greater than preset values. Thus, the mobile device 5 may be used to send the safety monitor report to the preset contact with positional data of the mobile device 5, so as to inform the preset contact of a safety status of the user of the mobile device 5.

In one embodiment, the safety monitoring system 20 obtains an acceleration and a gravity gradient of the mobile device 5 using a gravity sensor (G-sensor) 40. If the acceleration and the gravity gradient are greater than preset values, the safety monitoring system 20 obtains positional data of the mobile device 5 using a global positioning system (GPS) unit 42. Then, the safety monitoring system 20 searches a preset contact from a contact list 21 stored in a storage system 2, and sends a safety monitor report including the positional data to the preset contact. In one exemplary embodiment, the G-sensor 40 and the GPS unit 42 may be included on a printed circuit board (PCB) 4 of the mobile device 5. In one embodiment, the storage system 2 includes the safety monitoring system 20 and the contact list 21.

The CPU 1 controls execution of computerized codes of the safety monitoring system 20. In one embodiment, the mobile device 5 includes a central processing unit (CPU) 1, the storage system 2, an input/output device 3, and the PCB 4. The CPU 1 is electronically connected to the storage system 2, the input/output device 3, and the PCB 4. The PCB 4 is connected to the storage system 2. The storage system 2 may be a flash memory, and the input/output device 3 may include a liquid crystal display (LCD) and a keyboard, but the disclosure is not limited thereto. In one embodiment, the mobile device 5 may be a cell phone, a digital camera, or a personal digital assistant (PDA), for example.

Figure 2:
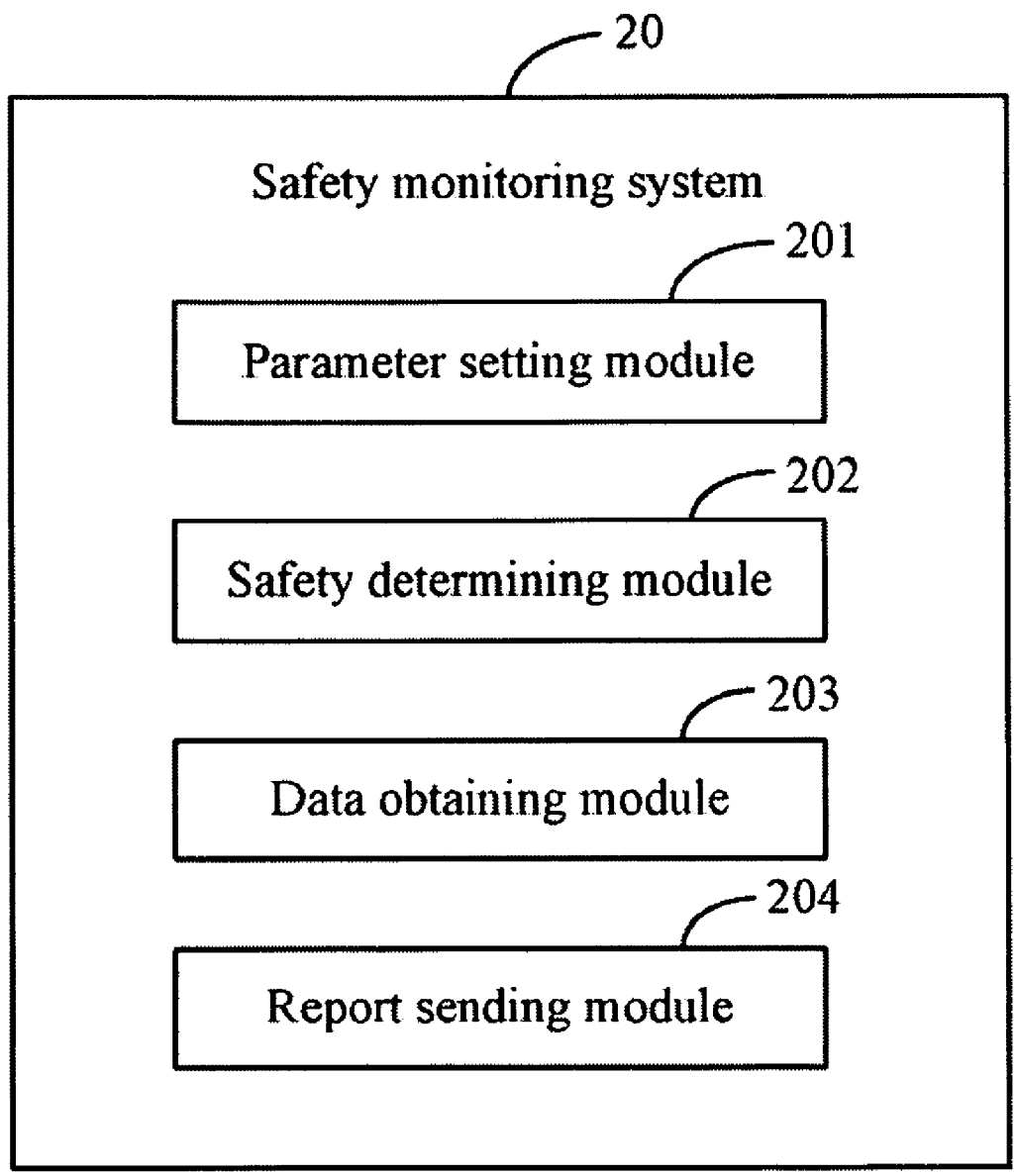
FIG. 2 is a block diagram of one embodiment of the safety monitoring system shown in FIG. 1.

FIG. 2 is a block diagram of one embodiment of the safety monitoring system 20 in FIG. 1. In one embodiment, the safety monitoring system 20 includes a parameter setting module 201, a safety determining module 202, a data obtaining module 203, and a report sending module 204.

Figure 4A:
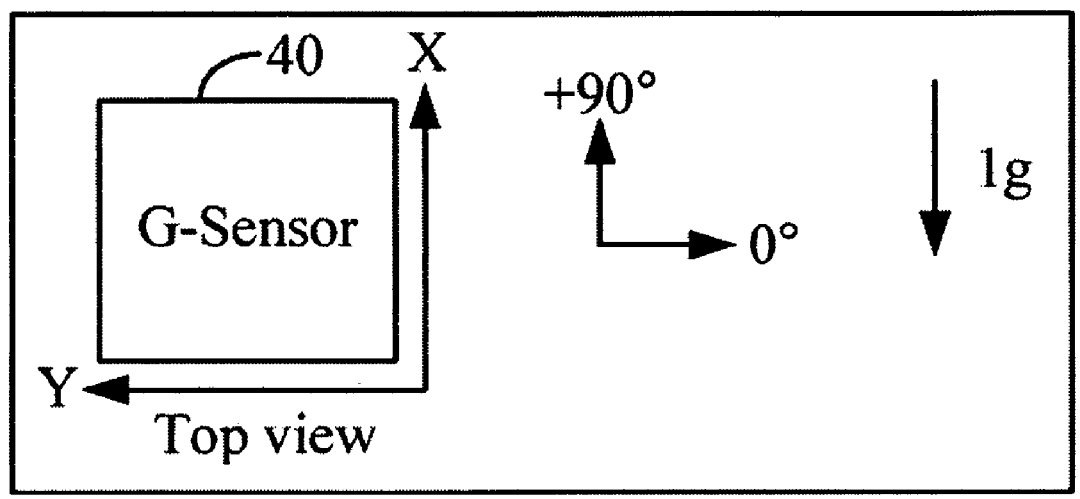
FIG. 4A is a top view of a G-sensor of the mobile device.

The parameter setting module 201 sets monitor parameters of the mobile device 5. In one embodiment, the monitor parameters include a preset acceleration of the mobile device 5, a preset gravity gradient of the mobile device 5, and a preset contact in the contact list 21. It is understood that, a gravity gradient is an angle between a sensitive axis of the G-sensor 40 and an acceleration of a Y-axis of the G-sensor 40 (refer to FIG. 4A and FIG. 4B). For example, in one embodiment, the preset acceleration is 6.5 meters/second^2, and the preset gravity gradient is 30 degrees.

The safety determining module 202 obtains an acceleration and a gravity gradient of the mobile device 5 using the G-sensor 40, and determines if the obtained acceleration is greater than the preset acceleration and if the obtained gravity gradient is greater than the preset gravity gradient.

If the obtained acceleration is greater than the preset acceleration and the obtained gravity gradient is greater than the preset gravity gradient, the data obtaining module 203 obtains positional data of the mobile device 5 using the GPS unit 42, and packs the positional data into short message service/multimedia message service (SMS/MMS) message.

The report sending module 204 searches for the preset contact from the contact list 21 in the mobile device 5, and sends a safety monitor report to the preset contact by the SMS/MMS message. In one embodiment, the SMS/MMS message includes the positional data of the mobile device 5.

If the obtained acceleration is less than or equal to the preset acceleration, or the obtained gravity gradient is less than or equal to the preset gravity gradient, the safety determining module 202 further obtains an acceleration and a gravity gradient of the mobile device 5 after a preset time interval.

Figure 3:
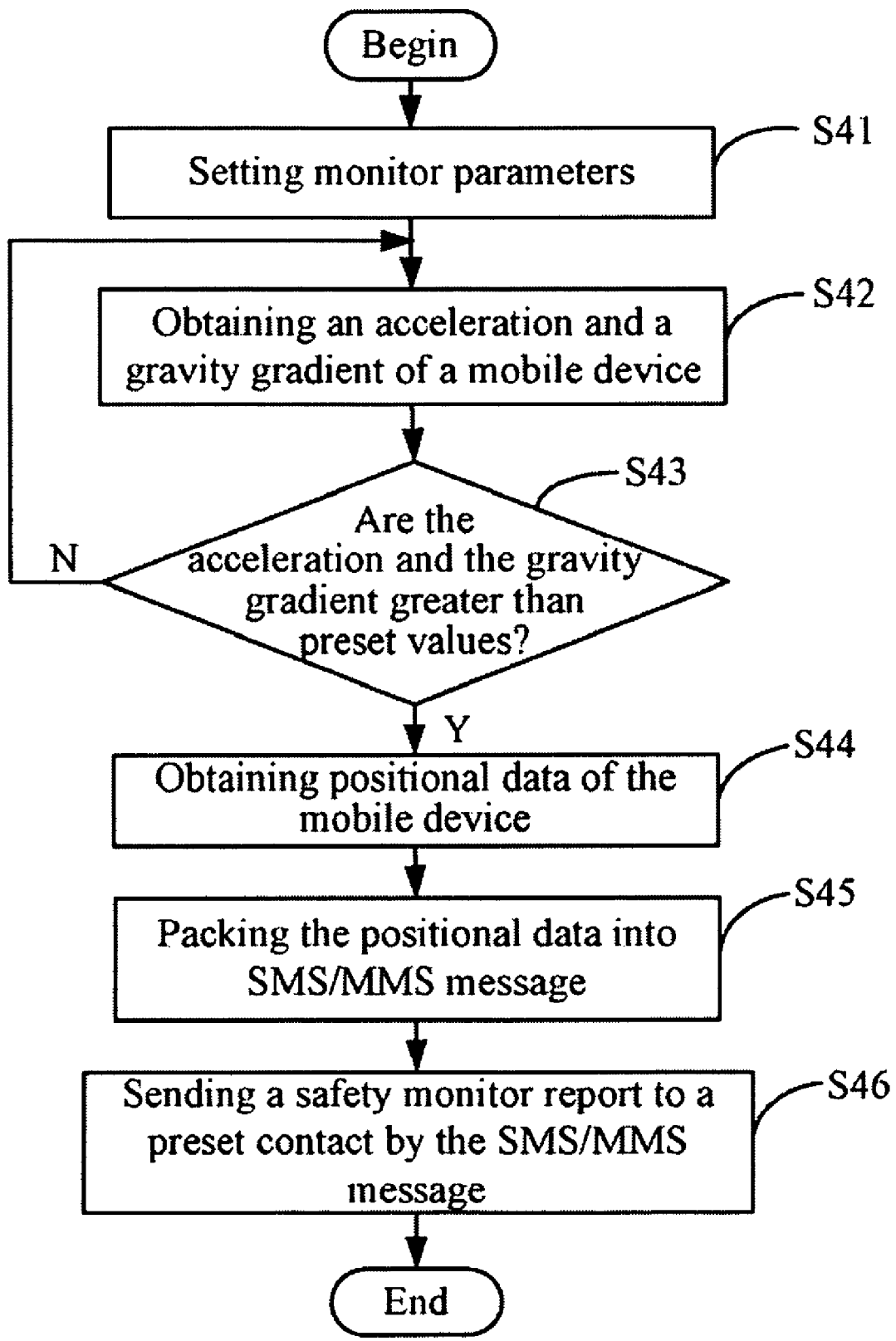
FIG. 3 is a flowchart of one embodiment of a method for sending a safety monitor report using the mobile device.

FIG. 3 is a flowchart of one embodiment of a method for sending a safety monitor report using the mobile device 5.

In block S41, the parameter setting module 201 sets monitor parameters of the mobile device 5. In one embodiment, as mentioned above, the monitor parameters include a preset acceleration of the mobile device 5, a preset gravity gradient of the mobile device 5, and a preset contact in the contact list 21 stored in the storage system 2.

In block S42, the safety determining module 202 obtains an acceleration and a gravity gradient of the mobile device 5 using the G-sensor 40.

In block S43, the safety determining module 202 determines if the obtained acceleration is greater than the preset acceleration and if the obtained gravity gradient is greater than the preset gravity gradient. If the obtained acceleration is greater than the preset acceleration and the obtained gravity gradient is greater than the preset gravity gradient, the procedure goes to block S44. Otherwise, if the obtained acceleration is less than or equal to the preset acceleration, or the obtained gravity gradient is less than or equal to the preset gravity gradient, the procedure returns to block S42.

In block S44, the data obtaining module 203 obtains positional data of the mobile device 5 using the GPS unit 42.

In block S45, the data obtaining module 203 packs the positional data into short message service/multimedia message service (SMS/MMS) message.

In block S46, the report sending module 204 searches for the preset contact from the contact list 21 in the mobile device 5, and sends a safety monitor report to the preset contact by the SMS/MMS message. In one embodiment, the SMS/MMS message includes the positional data of the mobile device 5.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A safety monitoring method using a mobile device, the method comprising:
    setting monitor parameters, wherein the monitor parameters comprise a preset acceleration and a preset gravity gradient of the mobile device, and a preset contact;
    obtaining an acceleration and a gravity gradient of the mobile device using a gravity sensor (G-sensor) of the mobile device, the gravity gradient being an angle between a sensitive axis of the G-sensor and an acceleration of a Y-axis of the G-sensor;
    obtaining positional data of the mobile device using a global positioning system (GPS) unit of the mobile device if the obtained acceleration is greater than the preset acceleration and the obtained gravity gradient is greater than the preset gravity gradient;
    packing the positional data into short message service/multimedia message service (SMS/MMS) message; and
    searching for the preset contact in the mobile device, and sending a safety monitor report to the preset contact by the SMS/MMS message.

2. The method according to claim 1, wherein the G-sensor is included on a printed circuit board (PCB) of the mobile device.

3. The method according to claim 2, wherein the GPS unit is included on the PCB of the mobile device.

4. The method according to claim 1, wherein the mobile device is selected from the group consisting of a cell phone, a digital camera, and a personal digital assistant (PDA).

5. A non-transitory storage medium having stored thereon instructions that, when executed by a processor of a mobile device, causes the processor to perform a safety monitoring method using the mobile device, the method comprising:
    setting monitor parameters, wherein the monitor parameters comprise a preset acceleration and a preset gravity gradient of the mobile device, and a preset contact;
    obtaining an acceleration and a gravity gradient of the mobile device using a gravity sensor (G-sensor) of the mobile device, the gravity gradient being an angle between a sensitive axis of the G-sensor and an acceleration of a Y-axis of the G-sensor;
    obtaining positional data of the mobile device using a global positioning system (GPS) unit of the mobile device if the obtained acceleration is greater than the preset acceleration and the obtained gravity gradient is greater than the preset gravity gradient;
    packing the positional data into short message service/multimedia message service (SMS/MMS) message; and
    searching for the preset contact in the mobile device, and sending a safety monitor report to the preset contact by the SMS/MMS message.

6. The storage medium according to claim 5, wherein the G-sensor is included on a printed circuit board (PCB) of the mobile device.

7. The storage medium according to claim 6, wherein the GPS unit is included on the PCB of the mobile device.

8. The storage medium according to claim 5, wherein the mobile device is selected from the group consisting of a cell phone, a digital camera, and a personal digital assistant (PDA).

9. A safety monitoring system in a mobile device, comprising:
    a parameter setting module operable to set monitor parameters, wherein the monitor parameters comprise a preset acceleration and a preset gravity gradient of the mobile device, and a preset contact;
    a safety determining module operable to obtain an acceleration and a gravity gradient of the mobile device using a gravity sensor (G-sensor) of the mobile device, and determine if the obtained acceleration is greater than the preset acceleration and the obtained gravity gradient is greater than the preset gravity gradient, the gravity gradient being an angle between a sensitive axis of the G-sensor and an acceleration of a Y-axis of the G-sensor;
    a data obtaining module operable to obtain positional data of the mobile device using a global positioning system (GPS) unit of the mobile device, if the obtained acceleration is greater than the preset acceleration and the obtained gravity gradient is greater than the preset gravity gradient;
    the data obtaining module further operable to pack the positional data into short message service/multimedia message service (SMS/MMS) message; and
    a report sending module operable to search for the preset contact in the mobile device, and send a safety monitor report to the preset contact by the SMS/MMS message.

10. The system according to claim 9, wherein the G-sensor is included on a printed circuit board (PCB) of the mobile device.

11. The system according to claim 10, wherein the GPS unit is included on the PCB of the mobile device.

12. The system according to claim 11, wherein the mobile device is selected from the group consisting of a cell phone, a digital camera, and a personal digital assistant (PDA).

* * * * *